April 12, 1960 N. G. WINTERMANTEL 2,932,270
METHOD OF MAKING MUDGUARDS
Filed Jan. 22, 1957 2 Sheets-Sheet 1
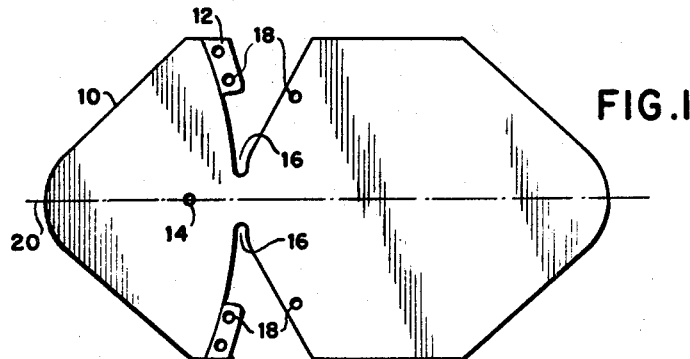
FIG.1
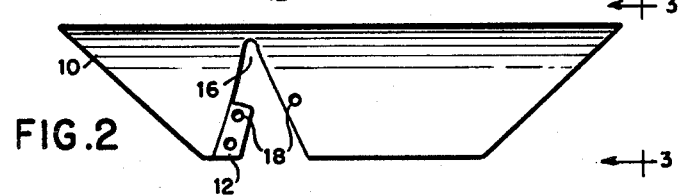
FIG.2
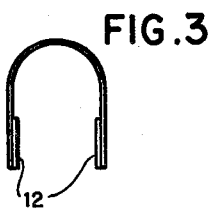
FIG.3
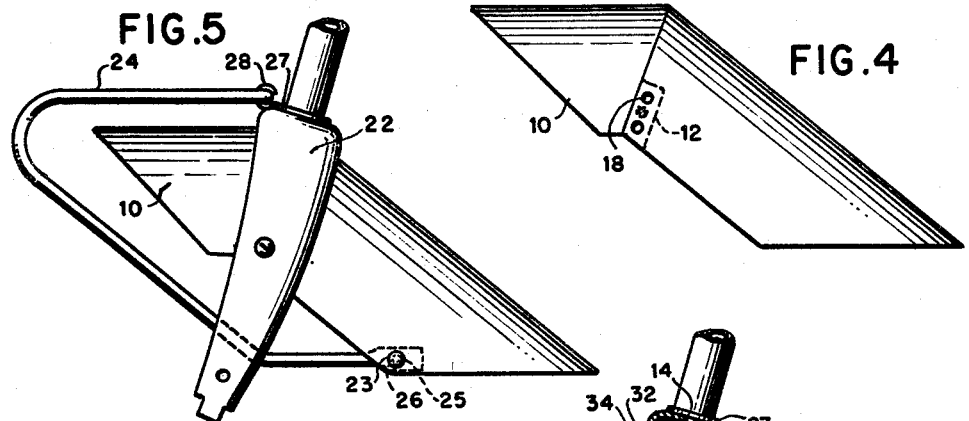
FIG.4
FIG.5
FIG.6
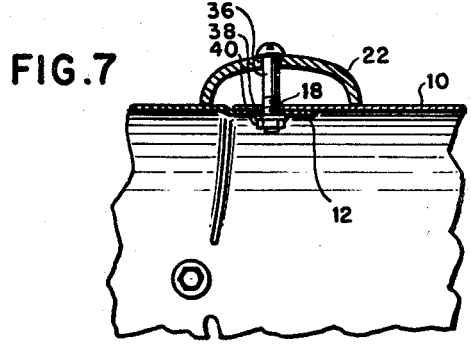
FIG.7
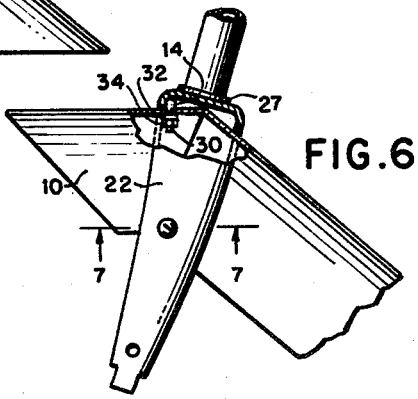
Norman G. Wintermantel
INVENTOR.
BY
ATTORNEY April 12, 1960    N. G. WINTERMANTEL    2,932,270
METHOD OF MAKING MUDGUARDS
Filed Jan. 22, 1957      2 Sheets-Sheet 2
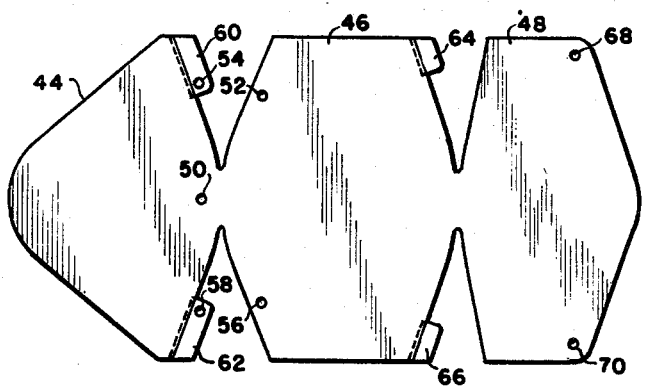
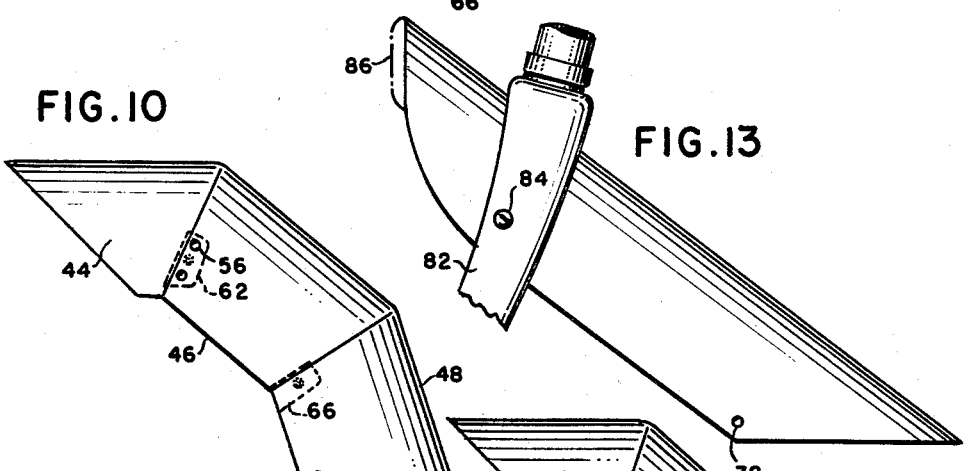
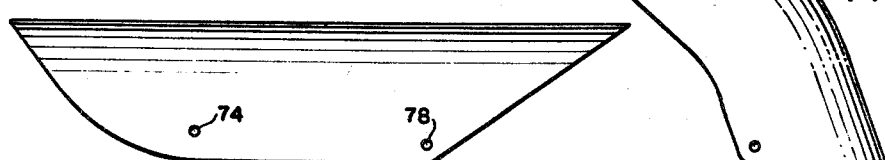
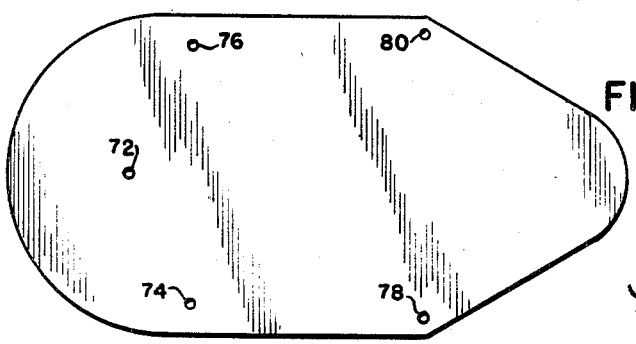
Norman G. Wintermantel
INVENTOR.
BY
ATTORNEY

United States Patent Office 2,932,270
Patented Apr. 12, 1960

2,932,270

METHOD OF MAKING MUDGUARDS

Norman G. Wintermantel, Palos Heights, Ill., assignor to American Machine & Foundry Company, a corporation of New Jersey Application January 22, 1957, Serial No. 635,198

2 Claims. (Cl. 113—116)

This invention relates to a mudguard for cycles such as a bicycle or a tricycle, and more particularly to the construction and method for making the same.

The mudguards heretofore employed on velocipedes have been more or less of a standard form which is arcuate and conformed to the general configuration of the wheel. This form has been relatively expensive to make and consequently increased the cost of the velocipedes since they generally required special machines and forming tools to make mudguards.

It is the purpose of this invention to provide a modernistic mudguard which will be of such simple construction that it will be more economical to construct than the mudguards heretofore employed.

It is therefore an object of this invention to provide a mudguard which will be of a simple design and low in manufacturing cost.

A further object of this invention is to provide a mudguard for a bicycle or tricycle which is made from a flat, single sheet of metal, and which will require few and simple forming operations, and will be readily adaptable for mounting accessories thereon as mudguard grills and ornaments.

Other objects and features of the invention will appear as the description of the particular physical embodiment selected to illustrate the invention progresses. In the accompanying drawings, which form a part of this specification, like characters of reference have been applied to the corresponding parts throughout the several views which make up the drawings.

Fig. 1 is a plan view of the sheet metal mudguard blank showing the pre-punched holes and slots before assembly into the form of a mudguard.

Fig. 2 is a side view of the mudguard in its first stage of bending.

Fig. 3 is an end view taken on line 3—3 of Fig. 2.

Fig. 4 is a side view of the mudguard showing the second and final stage of bending.

Fig. 5 is a modified form of my invention showing a grill secured to my mudguard and assembled with the front fork of a bicycle.

Fig. 6 is a cut-away section view of the front fork and mudguard showing the method of assembly.

Fig. 7 is a partial sectional view of the front fork and mudguard showing the method of assembly taken on line 7—7 of Fig. 6.

Fig. 8 shows another modified form of my invention wherein a slight curve is impressed upon a section in the final bending process.

Fig. 9 shows a modified form of a mudguard blank stamping designed for a triple bend.

Fig. 10 shows the stamping of Fig. 9 bent into the shape of a mudguard.

Fig. 11 shows a modified form of a mudguard blank designed for a single bending operation.

Fig. 12 shows the blank illustrated in Fig. 11 after it has been bent into the shape of a mudguard.

Fig. 13 shows the shaped mudguard assembled with the front fork of a cycle.

In the drawings, I have shown how my mudguard is constructed and assembled with the front fork of a cycle such as a bicycle or a tricycle. The mudguard is shaped from a flat sheet metal stamping 10 having assembly ears 12, a pre-punched top assembly hole 14, the angle forming slots 16, and side assembly holes 18. The cutting and stamping of the mudguard blank 10 may be done in one operation using a conventional stamping die, which facilitates reducing the cost of manufacturing in the blanking operation.

In Fig. 2, I have shown the mudguard blank number 10 after the first bending operation. The first bending operation of the blank 10 consists simply of bending the mudguard blank 10 to a specific radius along its longitudinal axis 20. This bending operation develops the curved surface and the width of the mudguard as shown in Fig. 3. The combination of the two functions in one operation also tends to lessen the cost of manufacture.

In Fig. 3, I have shown the indentation of the assembly ears 12 which are indented during the cutting and stamping operation. The second bending operation is shown in Fig. 4 and consists of drawing the sides of the angle forming slots number 16 together to form the parallelogram configuration of the mudguard. In this operation, the side assembly holes 18 become aligned with each other. In this operation, the assembly ears 12 are spot welded to the inside of the mudguard. The indentation of off-setting of the assembly ears 12 allow for a smooth exterior surface between the two sides of the angle forming slots 16. This bending and spot welding operation completes the forming of the mudguard.

It will be noted this design of mudguard is readily adaptable to have accessories attached thereto such as the grill 24 shown in Fig. 5. This grill not only has a pleasing ornamental appearance but also acts as a protective agent for the mudguard. Fig. 5 shows the location of the grill 24 in relation to the front fork 22 and the assembled mudguard.

It will be appreciated that if the grill 24 is to be used, the mudguard may be provided with two grill mounting holes 26. These holes can be added during the stamping and forming operation by use of a suitable punch, or may be made during the assembly operation. The other end of the grill or truss rod 24 may be attached to the front fork 22 in any suitable manner. In the embodiment shown in Fig. 5, I have employed a collar 27 having a hook 28 to which the upper end of the grill 24 is secured while the lower end of the grill 24 is secured to the mudguard by suitable means such as conventional rivets or by the bolt 23 and the nut 26 and washer 25 mentioned below. The hook 28 may be turned upwardly as shown in Fig. 5 or may be turned downwardly, at the option of the manufacturer. The lower legs of the grill 24, instead of being attached to the mudguard as shown, could be shortened at the point shown passing behind the fork in Fig. 5 and secured thereto by suitable means such as a rivet or bolt.

In Fig. 6, I have shown how the mudguard may be attached to the front fork 22 of a cycle by means of a suitable sheet metal screw or by a bolt 30 which passes through the top assembly hole 14 and is fixed by means of a washer 32 and a nut 34 on the underside of the mudguard. It may be noted that the seam of the bend of the angle forming slot 16 is covered by the prongs of the front fork 22, thus concealing the seam from view.

In Fig. 7, I have more clearly shown how the mudguard is attached to the front fork number 22 by suitable means such as a tubular rivet or by a bolt 36 passing through the side assembly holes 18 of the mudguard and fixed by a washer number 38 and a nut 40 on the inside of the mudguard. I have also shown in Fig. 7 the location of the side of the angle forming slot 16 with respect to the assembly ears 12.

In the embodiment shown in Fig. 8, I have shown how the structure disclosed in Figs. 1 to 7 may be modified to impart a slight bend to the slanted portion of the mudguard. This slight bend 42 can be imparted without using expensive drawing and forming dies because the main forming operation is accomplished by the slitting and bending operation already described in connection with Figs. 1 to 7. In this case, the joinder of the two halves will also be underneath the front fork legs so they will not be visible.

In Figs. 9 and 10, I have shown a further modification of my invention. In this case, the stamped blank shown in Fig. 9 consists of three segments 44, 46 and 48. The segments 44 and 46 have mudguard attaching holes 50, 52, 54, 56 and 58 formed therein. The ears 60 and 62 are slightly offset with respect to the segment 44 so that when segments 44 and 46 have been bent and pushed together as shown in Fig. 10, the surfaces of 44 and 46 will be flat and in the same plane while the ears 60 and 62 will extend on the underside of segment 46.

Suitable rivets extending through holes 52, 54 and 56, 58 will hold the two segments together when they have been bent in the manner already described in connection with Figs. 1 to 7. In this embodiment, a second bend is effected between segments 46 and 48 which is not found in the embodiment disclosed in Figs. 1 to 7. In this case, a pair of ears 64 and 66 extend from the segment 46 and are offset in a manner similar to ears 60 and 62. The segments 44, 46 and 48 are all bent at the same time and the rear segments 46 and 48 are brought together after this bending operation to bring the ears 64 and 66 underneath the segment 48 so that the external surfaces of the segments 46 and 48 will be flat. The ears 64 and 66 may be spot welded to segment 48 to maintain a smooth surface.

The rear segment 48 may be provided with holes 68 and 70 to which a truss rod may be attached in the same manner as shown in Fig. 5. In the embodiment just described, I have provided a novel way of forming a mudguard which can be manufactured from simple blank stampings which are merely bent together by simple forming tools into the shape of a modernistic mudguard which does not require any sheet metal rolling or drawing operations.

In Figs. 11, 12 and 13, I have shown another embodiment of my invention wherein a single sheet of metal may be so shaped that it will require only one bending operation to provide an effective and acceptable mudguard for a cycle. The single stamping shown in Fig. 11 may be provided with holes 72, 74, 76, 78 and 80.

When the blank shown in Fig. 11 is bent to the shape shown in Fig. 12, the holes 74 and 76 will be opposite to each other and adjacent to the front fork legs 82 of a cycle. Suitable rivets or bolts 84 are inserted through the sides of fork legs 82 into the holes 74 and 76 so as to secure the sides of the mudguard to the legs to which they are adjacent. The center hole 72 has a screw passing therethrough into the upper end of the fork 82 to secure the mudguard to the fork.

The rear holes 78 and 80 may support the lower end of a truss rod in a manner similar to that shown in Fig. 5. The upper end of the mudguard shown in Fig. 13 may also be provided with a suitable ornament 86 which will partially close the upper end of the mudguard without interfering with the rotation of the front wheel.

In the embodiments shown in Figs. 11 to 13, the design is of an extremely simple nature and still possesses the functional requirements of a mudguard that is acceptable to the public.

The invention hereinabove described may be varied in construction within the scope of the claims, for the particular device selected to illustrate the invention is but one of many possible embodiments of the same. The invention, therefore, is not to be restricted to the precise details of the structure shown and described.

What is claimed is:

1. The method of forming a mudguard comprising the steps of blanking out an elongated flat sheet of metal and forming therein tapered notches which extend inwardly from the opposite edges to a point closely adjacent the center and also forming tabs on at least one of the edges of each of said notches, arching the central portion and bending the opposite side edges toward each other until the sides are spaced and substantially parallel to each other, then bending the arched portion through a median line extending through the notches to bring the edges of each notch into abutment with each other, then securing the edges to each other by means of the tabs to provide a mudguard with a joint adaptable to be received in a cycle fork.

2. The process of manufacturing mudguards which comprises the steps of cutting out a sheet of elongated metal and forming therein tapered notches which extend inwardly from the opposite sides to a position adjacent the central axis of said elongated metal sheet, folding the sides of said sheet so that an arch is formed and the sides of the sheet are spaced and parallel to each other, then bending the arched sheet at a median line extending through the slotted area of said notches until the edges of each notch contact each other, then securing said edges to each other to provide a mudguard adapted to be received in the fork of a cycle.

References Cited in the file of this patent

UNITED STATES PATENTS

| 617,836 | Peterson | Jan. 17, 1899 |
| 941,228 | Chisolm | Nov. 23, 1909 |
| 2,556,738 | Peterson | June 12, 1951 |
| 2,606,517 | Dunlop | Aug. 12, 1952 |
| 2,650,857 | Watter | Sept. 1, 1953 |

FOREIGN PATENTS

| 21,788 | Great Britain | of 1897 |
| 336,249 | Great Britain | Oct. 6, 1930 |